United States Patent [19]

Kluttz

[11] Patent Number: 4,795,774
[45] Date of Patent: Jan. 3, 1989

[54] POLYKETONE STABILIZATION

[75] Inventor: Robert Q. Kluttz, Houston, Tex.

[73] Assignee: Shell Oil Company, Houston, Tex.

[21] Appl. No.: 104,466

[22] Filed: Oct. 5, 1987

[51] Int. Cl.$^4$ ................................................ C08K 5/18
[52] U.S. Cl. .................................. 524/246; 524/248; 524/254; 524/255; 524/256; 524/257; 524/258
[58] Field of Search ............... 524/246, 254, 255, 256, 524/257, 258, 248

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,929,727 | 12/1975 | Russell et al. | 260/48.95 F |
| 3,948,832 | 4/1976 | Hudgin | 260/23 EP |
| 3,948,850 | 4/1976 | Hudgin | 260/45.7 P |
| 3,968,082 | 7/1976 | Hudgin | 260/45.85 H |
| 4,024,104 | 5/1977 | Russell et al. | 260/45.8 R |
| 4,139,522 | 2/1979 | Lantor | 260/45.75 R |

FOREIGN PATENT DOCUMENTS

| | | |
|---|---|---|
| 0121965 | 8/1984 | European Pat. Off. . |
| 0181014 | 5/1986 | European Pat. Off. . |
| 0213671 | 3/1987 | European Pat. Off. . |
| 1081304 | 3/1965 | United Kingdom . |

OTHER PUBLICATIONS

Kirk Othmer Encyclopedia of Chemical Technology, Second Edition, vol. 12, pp. 132, 1967.

*Primary Examiner*—Veronica P. Hoke

[57] ABSTRACT

Polymeric compositions of enhanced stability against oxidative degradation are produced when aromatic amines of up to 2 aromatic rings and at least one amino group are incorporated in polymers of carbon monoxide and at least one ethylenically unsaturated hydrocarbon.

23 Claims, No Drawings

POLYKETONE STABILIZATION

FIELD OF THE INVENTION

This invention relates to an improved method of stabilizing linear alternating polymers of carbon monoxide and at least one ethylenically unsaturated hydrocarbon against oxidative deterioration. The invention further relates to a method of stabilizing such polymers against oxidative deterioration by incorporating therein a stabilizing quantity of certain aromatic amines.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical catalysts, i.e., peroxy compounds. U.K. Pat. No. 1,081,304 produced similar polymers of higher carbon monoxide content in the presence of alkylphosphine complexes of palladium salts as catalyst. Nozaki extended this process through the use of arylphosphine complexes of palladium, for example, U.S. Pat. No. 3,694,412.

More recently, the class of linear alternating polymers of carbon monoxide and at least one ethylenically unsaturated hydrocarbon, e.g., polymers of carbon monoxide and ethylene or ethylene and propylene, has become of greater interest because of the greater availability of the polymers. These polymeric materials, also known as polyketones, have been shown to be of the formula $-CO-(A)-$ where A is the moiety obtained by polymerization of the hydrocarbon through the ethylenic unsaturation. For example, when the unsaturated hydrocarbon is ethylene the polymer is represented by the formula $-CO-(CH_2-CH_2)-$. The general process for the production of such polymers is shown by published European Patent Application Nos. 0,121,965 and 0,181,014. The process generally involves the use of a catalyst composition formed from a compound of a Group VIII metal selected from palladium, cobalt or nickel, the anion of a non-hydrohalogenic acid having a pKa less than 2 and a bidentate ligand of phosphorus, arsenic or antimony.

The class of polyketones is characterized by relatively high melting points, generally over 175° C. and frequently over 210° C. As the polymers are useful as premium thermoplastics, they are frequently processed at elevated temperatures at or near the melting point. During such processing, the polymer is often heated in air to such elevated temperature and maintained at the elevated temperature for a period of time which will vary with the nature of the processing. Although the polyketone polymers are relatively stable at such temperatures, they will undergo heat or oxidative deterioration depending in part on the nature and melting point of the particular polymer.

Methods are available to stabilize the carbon monoxide/ethylene copolymers against heat or thermal degradation as determined by cross-linking of the polymer. Russell et al discloses the use of certain benzophenones, U.S. Pat. No. 3,929,727, or certain benzotriazoles, U.S. Pat. No. 4,024,104, to stabilize these copolymers against thermal degradation. Hudgin stabilizes such polymers against thermal degradation by using organic epoxy compounds (U.S. Pat. No. 3,948,832), phosphoric acid salts (U.S. Pat. No. 3,948,850) or organic polythiol compounds (U.S. Pat. No. 3,968,082). Lantor, U.S. Pat. No. 4,139,522 uses manganous salts of phosphorus oxyacids for the same purpose. It would be of advantage to provide polyketone polymers of improved stability against oxidative deterioration.

SUMMARY OF THE INVENTION

This invention is directed to an improved method of stabilizing linear alternating polymers of carbon monoxide and at least one ethylenically unsaturated hydrocarbon against oxidative degradation. More particularly, a linear alternating polyketone polymer of enhanced oxidative stability is provided when an aromatic amine of defined structure is incorporated within the polymer.

DESCRIPTION OF THE INVENTION

The polymers which are stabilized according to the invention are linear alternating polymers of carbon monoxide and at least one ethylenically unsaturated hydrocarbon. Suitable ethylenically unsaturated hydrocarbons useful as precursors of the polyketone polymers have from 2 to 20 carbon atoms inclusive, preferably up to 10 carbon atoms inclusive, and are aliphatic such as ethylene and other α-olefins including propylene, 1-butene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, m-ethylstyrene and 2,4-dimethylstyrene. Preferred polyketone polymers are copolymers of carbon monoxide and ethylene or terpolymers of carbon monoxide, ethylene and a second α-olefin of from 3 to 20 carbon atoms inclusive, particularly propylene. Copolymers of carbon monoxide and ethylene are most effectively stabilized according to the present invention.

The structure of the preferred polymers is that of linear alternating polymer of carbon monoxide and ethylenically unsaturated hydrocarbon and the polymer will contain substantially one molecule of carbon monoxide for each molecule of ethylenically unsaturated hydrocarbon. When terpolymers of carbon monoxide, ethylene and a second ethylenically unsaturated hydrocarbon are employed there will be at least two units incorporating a moiety of ethylene per unit employing a moiety of the second hydrocarbon, preferably from about 10 to about 100 units incorporating a moiety of ethylene per unit incorporating a moiety of the second hydrocarbon. The polymer chain is therefore illustrated by the formula

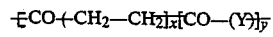   I wherein Y is a moiety of the second hydrocarbon polymerized through the ethylenic unsaturation. The $-CO-(CH_2-CH_2)-$ units and the $-CO-(Y)-$ units are found randomly throughout the polymer chain and the ratio of y:x is no more than about 0.5. In the most preferred modification where copolymers of carbon monoxide and ethylene are employed without the presence of a second hydrocarbon, the polymer is represented by the above Formula I wherein y=0. In other modifications where y is other than 0, i.e., where terpolymers are stabilized, ratios of y:x from about 0.01 to about 0.1 are preferred. The "caps" or end groups of the polymer will depend on what materials are present during the production of the polymer and whether and how the polymer has been purified. The precise nature of the end groups is of little significance with regard to the overall properties of the polymer so that the polymer is fairly represented in terms of the polymer chain as depicted above.

Of particular interest are the polymers of molecular weight from about 1,000 to about 200,000, particularly those of molecular weight from about 10,000 to about 50,000 containing substantially equimolar quantities of carbon monoxide and unsaturated hydrocarbon. The physical properties of such polymers depend in part on the molecular weight, whether the polymer is a copolymer or a terpolymer and the relative proportion of any second hydrocarbon present in the polymer. Typical melting points of such polymers are from about 175° C. to about 300° C. and more frequently from about 210° C. to about 270° C.

A method of producing such polymers which is now becoming conventional is to contact the carbon monoxide and unsaturated hydrocarbon(s) with a catalyst composition formed from a palladium salt, preferably a palladium carboxylate such as palladium acetate, the anion of a non-hydrohalogenic acid having a pKa below about 6, for example the anion of trifluoroacetic acid or p-toluenesulfonic acid and a bidentate phosphorus ligand of defined structure such as 1,3-bis(diphenylphosphino)propane. Such a process for polyketone production is illustrated by published European Patent Application No. 0,181,014 and by copending U.S. applications Ser. No. 908,899, filed Sept. 18, 1986 (K-0534 N) and Ser. No. 935,431 filed Nov. 14, 1986.

The present invention relates to polyketone polymers which have been stabilized against oxidative deterioration by the incorporation therein of a stabilizing quantity of an aromatic amine stabilizer of from 1 to 2 aromatic rings, from 6 to 50 carbon atoms inclusive and at least one amino group, i.e., at least one

group. Preferred aromatic amines are of the formula

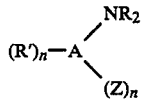

II wherein A is an aromatic ring system of from one to two aromatic rings, Z is selected from the groups —$NR_2$ or —OR, R independently is hydrogen, alkyl or aryl, R' is alkyl and n independently is an integer from 0 to 2 inclusive. Particularly preferred are those aromatic amine stabilizers of Formula II wherein at least one Z group is present.

The aromatic ring system A is a ring system of from 1 to 2 aromatic rings and the aromatic amine can therefore be viewed as a derivative of benzene, naphthalene or biphenyl. The system is optionally substituted with up to 2 R' groups which are alkyl groups independently having up to 10 carbon atoms but preferably are lower alkyl of up to 4 carbon atoms. When substituted with R' groups, the aromatic ring system is randomly substituted and the R' substituents, in a two aromatic ring system, are on the same ring or different rings from the —$NR_2$ group. The aromatic ring system will have at least one —$NR_2$ group wherein R is hydrogen, lower alkyl or aryl including alkaryl of up to 10 carbon atoms. The aromatic ring system is further substituted with up to two B groups which independently are —$NR_2$ groups as previously defined or are —OR groups wherein R has the previously stated significance.

When the amine stabilizer of the invention has an aromatic ring system of one aromatic ring, it can be considered to be a derivative of benzene. Illustrative of such compounds are aniline, methoxyaniline, p-aminophenol, diphenylamine, 4-methoxy-2-methylaniline, 3-amino-o-cresol, 4-amino-m-cresol, 4-amino-2,5-dimethylphenol, 3-diethylaminophenol, 4-pentyloxyaniline, 2,5-dimethoxyaniline, N-ethyl-4-ethoxyaniline, N,N-dimethylaniline, N,N'-dioctyl-p-phenylenediamine, N,N'-diphenyl-p-phenylenediamine and N,N,N',N'-tetramethyl-p-phenylenediamine.

When the aromatic ring system has two aromatic rings the amine stabilizer can be viewed as a derivative of naphthalene or of biphenyl, depending upon whether the rings are fused or attached solely by a bond between ring carbon atoms of the aromatic rings. Illustrative naphthalene derivatives are 2-aminonaphthalene, 1,8-diaminonaphthalene, 1-hydroxy-4-amino-naphthalene, 1-methylamino-5-hydroxynaphthalene, 1,8-bis(dimethylamino)naphthalene, 3-propoxy-2-aminonaphthalene, 1,5-diaminonaphthalene, 2-dimethylamino-7-diethylaminonaphthalene, and 1-amino-4-methyl-8-methoxynaphthalene. Illustrative biphenyl derivatives are N,N'-diphenylbenzidine, N,N,N',N'-tetramethylbenzidine, 2,2'-dimethylbenzidine and 4-amino-4'-methoxybiphenyl. In general, the amine stabilizers having an aromatic ring system of one aromatic ring are preferred over those having an aromatic ring system of two aromatic rings, especially those having one Z group and no more than one R' group.

The amine stabilizer is employed in a stabilizing quantity effective to retard the oxidative degradation of the polymer into which it is incorporated. Amounts of aromatic amine stabilizer from about 0.01% by weight to about 10% by weight, based on total composition, are suitable with amounts from about 0.1% by weight to about 5% by weight on the same basis being preferred.

The amine stabilizer is incorporated within the polymer by conventional methods. In one modification the amine is dissolved in a suitable solvent, e.g., an alcohol such as methanol or ethanol, or a hydrocarbon such as toluene, the polymer in particulate form is added with mixing and the solvent is removed as by evaporation. Alternatively, the amine stabilizer and polymer powder are dry-blended and converted to a composition by application of heat and pressure. In yet another modification the amine stabilizer and molten polymer are mixed in a mixer with high shear. In general, however, less energetic and lower temperature methods of incorporating the stabilizer are preferred. The stabilized composition may also incorporate other conventional additives such as plasticizers, mold release agents, pigments and fillers and reinforcements which are also added and mixed by conventional methods at the same time or at a different time from the incorporation of the aromatic amine stabilizer.

The resulting amine-polymer compositions exhibit enhanced oxidative stability and are processed at elevated temperatures without undue oxidative degradation. Typical methods of processing include injection molding, pressure forming, thermoforming and sheet extrusion. The compositions have a variety of utilities but are particularly useful in applications where the processing of the polymer to an article is likely to include processing at elevated temperatures or where the article is likely to be subjected to conditions of elevated temperature. Such applications include the production of containers for food and drink as by thermoforming, the production of shaped parts for the automotive industry as by injection molding and the production of wire and cable as by extrusion.

The invention is further illustrated by the following Illustrative Embodiments which should not be construed as limiting.

ILLUSTRATIVE EMBODIMENT I

In the following screening experiments, the low molecular weight material, 3,6,9-undecantrione was used as a substrate to measure the effectiveness of various aromatic amine stabilizers. Although the undecantrione is not a polymer within the scope of those of the present invention, other experiments have shown that it may be used instead of a polyketone polymer in the evaluation of stabilizers and those stabilizers found to be effective in the triketone will also be effective in polyketone polymers. The choice of the polyketone as the substrate for the following experiments was because of ease of handling.

A series of aromatic amines was blended with 3,6,9-undecantrione in a concentration of 1% by weight based on total composition. The compositions were then heated in air at 180° C. After 1, 6 and 24 hours, samples were taken and analyzed by high resolution gas phase chromatography for the presence of furan and aldol products which are indicative of oxidative deterioration. The smaller the quantity of furan and aldol products, the greater the extent to which oxidative degradation has been retarded. The results of the series are shown in Table I. The term "tr" indicates a trace of the specified product.

TABLE I

| Additive | Time, hr | Furan, % | Aldol, % |
|---|---|---|---|
| None | 1 | 0.8 | 0.62 |
|  | 6 | 18 | 1.8 |
| 4-methoxyaniline | 1 | tr | 0.2 |
|  | 6 | tr | 0 |
|  | 24 | 11 | 0.3 |
| 4-aminophenol | 1 | 0 | 0.2 |
|  | 6 | 0 | 0 |
|  | 24 | 10 | 0 |
| N,N'—diphenyl-p-phenylenediamine | 1 | 2 | 0 |
|  | 6 | 7 | 0.2 |
|  | 24 | 24 | 0.7 |
| N,N'—diphenylbenzidine | 1 | 2 | 0 |
|  | 6 | 8 | 0.2 |
|  | 24 | 20 | 0.7 |
| Diphenylamine | 1 | 0.7 | 0 |
|  | 6 | 11 | 0.2 |
|  | 24 | 30 | 1 |
| 4-methoxy-2-methylaniline | 1 | 0.1 | 0.04 |
|  | 6 | 1.1 | 0.1 |
|  | 24 | 19 | 0.5 |
| 3-amino-o-cresol | 1 | 0.08 | 0.06 |
|  | 6 | 1.3 | 0.2 |
|  | 24 | 19 | 1 |
| N,N,N',N'—tetramethylphenylenediamine | 1 | 0 | 0.6 |
|  | 6 | 0.03 | 0.5 |
|  | 24 | 4 | 0.3 |
| 4-amino-m-cresol | 1 | 0.05 | 0.07 |
|  | 6 | 0.5 | 0.2 |
|  | 24 | 9 | 0.3 |
| 4-amino-2,5-dimethylphenol | 1 | 0 | 0 |
|  | 6 | 1.5 | 0.1 |

TABLE I-continued

| Additive | Time, hr | Furan, % | Aldol, % |
|---|---|---|---|
|  | 24 | 18 | 1 |
| 3-diethylaminophenol | 1 | 0 | 0.7 |
|  | 6 | 0.4 | 0.2 |
|  | 24 | 12 | 0.9 |
| 4-pentyloxyaniline | 1 | 0.1 | 0.1 |
|  | 6 | 1 | 0.2 |
|  | 24 | 21 | 1 |
| 2,5-dimethoxyaniline | 1 | 0.1 | 0.1 |
|  | 6 | 0.8 | 0.2 |
|  | 24 | 21 | 0.8 |

ILLUSTRATIVE EMBODIMENT II

A copolymer of carbon monoxide and ethylene was produced in the presence of a catalyst composition formed from palladium acetate, the anion of trifluoroacetic acid and 1,3-bis(diphenylphosphino)propane. When an effective quantity of 1,8-bis(dimethylamino)-naphthalene is incorporated in this polymer, a polymer composition of enhanced oxidative stability will be obtained.

ILLUSTRATIVE EMBODIMENT III

A terpolymer of carbon monoxide, ethylene and propylene was produced in the presence of a catalyst composition formed from palladium acetate, the anion of p-toluenesulfonic acid and 1,3-bis[di(2-methoxyphenyl)phosphino]propane. When an effective amount of 4-aminophenol is incorporated in the polymer, a polymer composition of enhanced stability against oxidative degradation will be obtained.

I claim:

1. The method of stabilizing a linear alternating polymer of carbon monoxide and at least one ethylenically unsaturated hydrocarbon by incorporating therein a stabilizing quantity of an aromatic amine of from 1 to 2 aromatic rings, from 6 to 50 carbon atoms and at least one amino group represented by the formula

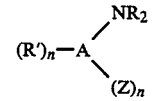

wherein A is an aromatic ring system derived from benzene, naphthalene or biphenyl, Z is selected from the group —$NR_2$ and —OR, R is selected from hydrogen, alkyl and aryl, R' is alkyl and n independently is an integer of from 0 to 2 inclusive.

2. The method of claim 1 wherein the polymer is represented by the formula

wherein B is a moiety of an ethylenically unsubstituted hydrocarbon of from 3 to 20 carbon atoms polymerized through the ethylenic unsaturation and the ratio of y:x is no more than about 0.5.

3. The method of claim 2 wherein the hydrocarbon is propylene.

4. The method of claim 3 wherein A is an aromatic ring system of 1 aromatic ring.

5. The method of claim 4 wherein the aromatic amine is N,N,N',N'-tetramethylphenylenediamine.

6. The method of claim 4 wherein the aromatic amine is 4-amino-m-cresol.

7. The method of claim 4 wherein y=0.

8. The method of claim 4 wherein the ratio of y:x is from about 0.01 to about 0.1.

9. The method of claim 3 wherein the A is an aromatic ring system of 2 aromatic rings.

10. The method of claim 9 wherein the aromatic amine is 1,8 bis(dimethylamino)naphthalene.

11. The method of claim 9 wherein the aromatic amine is N,N'-diphenylbenzidine.

12. A polymer composition stabilized against oxidative degradation which comprises a linear alternating polymer of carbon monoxide and at least one ethylenically unsaturated hydrocarbon and a stabilizing quantity of an aromatic amine of from 1 to 2 aromatic rings, from 6 to 50 carbon atoms and at least one amino group represented by the formula

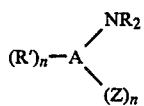

wherein A is an aromatic ring system derived from benzene, naphthalene or biphenyl, Z is selected from the group —NR$_2$ and —OR, R is selected from hydrogen, alkyl and aryl, R' is alkyl and n independently is an integer of from 0 to 2 inclusive.

13. The composition of claim 12 wherein the polymer is represented by the formula

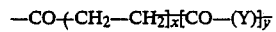

wherein B is an ethylenically unsaturated hydrocarbon of from 3 to 20 carbon atoms polymerized through the ethylenic unsaturation and the ratio of y:x is no more than 0.5.

14. The composition of claim 13 wherein Y is propylene.

15. The composition of claim 14 wherein y=0.

16. The composition of claim 15 wherein A is an aromatic ring system of one aromatic ring.

17. The composition of claim 16 wherein the aromatic amine is N,N,N',N'-tetramethyl-p-phenylenediamine.

18. The composition of claim 16 wherein the aromatic amine is 4-amino-m-cresol.

19. The composition of claim 14 wherein the ratio of y:x is from about 0.01 to about 0.1.

20. The composition of claim 19 wherein the aromatic amine is 1,8bis(dimethylamino)naphthalene.

21. The composition of claim 19 wherein A is an aromatic ring system of 1 aromatic ring.

22. The composition of claim 21 wherein the aromatic amine is 3-diethylaminophenol.

23. The composition of claim 21 wherein the aromatic amine is N,N,N',N'-tetramethylphenylenediamine.

* * * * *